Dec. 29, 1959  J. B. OSBORNE  2,919,244
PROCESS FOR EMERGENCY STEAM PRODUCTION
Filed June 17, 1955
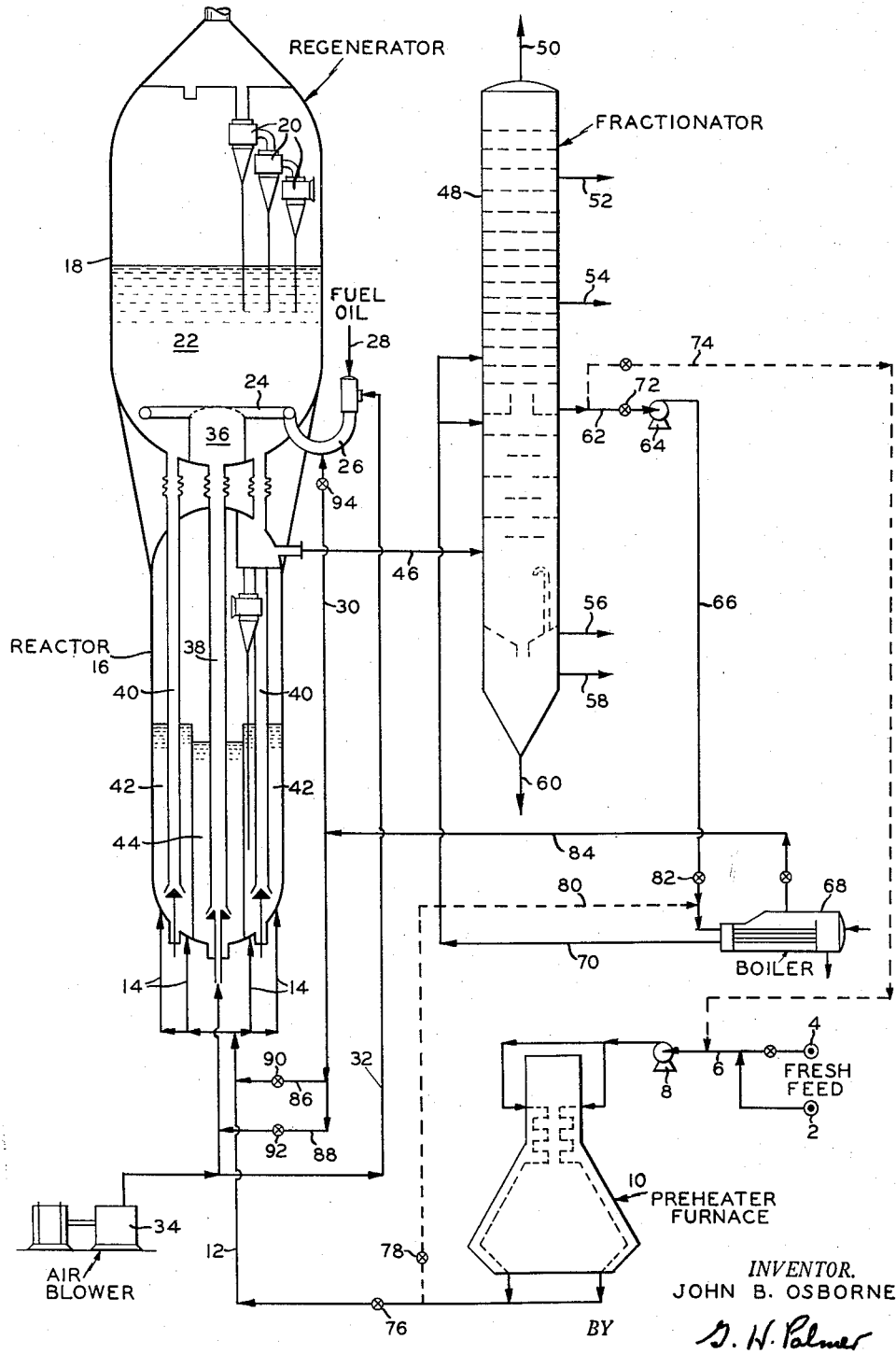
INVENTOR.
JOHN B. OSBORNE United States Patent Office 2,919,244
Patented Dec. 29, 1959

2,919,244

PROCESS FOR EMERGENCY STEAM PRODUCTION

John B. Osborne, South Orange, N.J., assignor to The M. W. Kellogg Company, Jersey City, N.J., a corporation of Delaware Application June 17, 1955, Serial No. 516,249

6 Claims. (Cl. 208—164)

This invention relates to a process for emergency steam production in an oil refinery utilizing equipment having a fluidized bed. Such refineries may be, for example, one having a fluid catalytic cracking unit or a fluid hydroforming unit and the like, in which a fluidized bed is used in a reactor for the conversion of hydrocarbons, the fluidized catalyst then being passed to a regenerator in which carbonaceous deposits are removed therefrom by burning.

Often-times in refineries using fluid catalytic cracking units, the normal steam requirements of the process are very near the maximum capacity of the steam producing plant, and an emergency situation is presented when a power failure occurs, which results in a shut down of electrically driven air blowers and the like. Without air pressure to maintain the catalyst in the reactor and the regenerator in a fluidized condition, and also to provide for catalyst recirculation, the catalyst in the fluidized beds settles and compacts, thus presenting serious difficulties when an attempt is made to restart the unit.

In this situation, it is highly desirable to have a ready supply of emergency steam to augment whatever steam may be available from the refinery power plant. This emergency steam is injected into the feed line to the reactor, to the catalyst lift line, and to the regeneration gas distributor and serves to maintain the catalyst beds in the reactor in a fluid state, thereby preventing settling of the catalyst with the difficulties attendant thereto. It is unnecessary that the emergency steam supply be capable of performing the entire duty in this regard since there will always be some steam available from the refinery power plant, even though the refinery requirements of steam may be close to the rated capacity of the steam boilers.

While the process of the present invention is not limited to its use in a system employing a fluid catalytic cracking unit or a fluid hydroforming unit, it has been designed in conjunction with a fluid catalytic cracking unit.

In a system using a fluid catalytic cracking unit, fresh feed from storage or from a crude unit is passed by means of a steam driven pump to a fresh feed furnace or preheater and the heated feed is then transferred to the nozzles of the reactor of a fluid catalytic cracking unit. The cracked products are withdrawn from the reactor at an elevated temperature and passed to a primary fractionating column from which a number of cuts are obtained, one of these cuts being a heavy gas oil fraction which is the normal recycle oil to the reactor. A portion of this heavy gas oil fraction, however, is passed through an intermediate reflux boiler where it is cooled and from which it is recycled to about the midpoint of the primary fractionating column thereby serving as a cooling stream to the fractionator and also serving to make a suitable quantity of steam in the intermediate reflux boiler. In this system, the reactor is provided with an air blower which provides the air for the catalyst lift, by means of which the catalyst is transferred from the reactor to the regenerator. The air blower also provides the air for the distributor ring in the regenerator, the air providing the necessary oxygen for catalyst regeneration. Plant air is also passed into the regenerator to aid in fluidizing the catalyst bed therein.

Should a power failure occur, the air blower, being electrically driven, will immediately shut down and the fluidized beds in the reactor and regenerator will immediately tend to settle. When this happens, the heavy gas oil fraction, which is normally taken as a side stream from the primary fractionator, is diverted to the suction side of the steam driven fresh feed pump. This heavy gas oil fraction is normally discharged from the fractionator at an elevated temperature and it is then further heated in the fresh feed furnace to a higher temperature, which is normally about the temperature of the fresh feed injected into the reactor, and is then recycled to the inlet of the intermediate reflux boiler, the heat from the heavy gas oil fraction being used therein to make emergency steam. This emergency steam is then transferred to the catalyst air lift line, to the fresh feed inlet nozzles on the reactor, and to the distributor ring in the regenerator. This emergency steam thus prevents the fluidized beds from settling for so long as the air blower may be down as the result of a power failure.

Since the heavy gas oil fraction is charged to the feed furnace or preheater at a temperature which is much higher than the temperature of the normal fresh feed, a much greater volume of heavy gas oil may be passed through the furnace than could be accommodated by the furnace if fresh feed were heated to the same discharge temperature. Hence, by forcing the fresh feed pump and the preheater furnace, it is possible to pass a large quantity of heated heavy gas oil through the intermediate reflux boiler and produce a relatively large amount of emergency steam. While the steam normally made in the intermediate reflux boiler is of about 98 percent quality, for emergency requirements steam having a lower quality may be used and accordingly, a greater quantity of lower quality steam may be produced, if desired.

Referring to the accompanying drawing which is a diagrammatical arrangement of apparatus in elevation, fresh feed from a crude unit 2 or from the storage 4 is passed by means of the transfer line 6 to the fresh feed pump 8, which is steam driven. The fresh feed pump 8 pumps the feed throuugh the preheater furnace 10, from which the fresh feed is discharged at a temperature of about 600° F., and passes by means of the transfer line 12 to the inlet nozzles 14 positioned on the bottom of the reactor 16. The reactor is surmounted by a regenerator 18 having the cyclones 20 and the fluidized catalyst bed 22 therein. The regenerator is also provided with a distributor ring 24 which is connected to an elbow 26 having the fuel oil line 28 and the emergency steam line 30 connected thereto. An air line 32 from the air blower 34 is also connected to the elbow 26.

A distributor vessel 36 is positioned in the bottom of the regenerator 18 and receives the catalyst transferred thereto through the catalyst lift conduit 38 positioned in the center of the reactor 16. The reactor 16 is also provided with the catalyst downcomers 40, the fluidized catalyst beds 42 and the stripper 44. This converter is described in detail in copending application, Serial Number 464,476, filed October 25, 1954.

The cracked products are withdrawn from the reactor 16 through the transfer line 46 and are introduced into a primary fractionating column 48 at a point below the midpoint of the column. A number of streams are removed from the primary fractionator through the lines 50, 52, 54, 56, 58 and 60. A heavy gas oil fraction is withdrawn from the fractionator 48, through the line 62, and is transferred by means of the steam driven pump 64, and the transfer line 66 to the intermediate reflux boiler 68, in which the heavy gas oil fraction is cooled, and the heat abstracted therefrom used to produce steam, and from which the cooled heavy gas oil fraction is recycled through the transfer line 70 to approximately the midpoint of the primary fractionator, the cooled gas oil fraction thus serving as a cooling stream to the fractionating tower.

When a power failure occurs, resulting in shut down of the air blower 34, the valve 72 in the line 62 is closed and the heavy gas oil fraction from the fractionator 48 is passed through the transfer line 74 to the suction side of the steam driven feed pump 8 from which the heavy gas oil fraction is discharged into the furnace 10 where it is heated and from which it is passed, by closing the valve 76 in the line 12 and opening the valve 78 in the transfer line 80, which connects to the inlet of the intermediate reflux boiler downstream from the valve 82, which is also closed when the reflux boiler is being used to produce steam under emergency conditions. The heavy gas oil fraction is then passed through the intermediate reflux boiler to produce steam and the cooled fraction is recycled through the transfer line 70 to the fractionator 48. The temperature of the heavy gas oil fraction will begin to fall when the system shuts down, but an equilibrium will soon be obtained in the fractionator and reflux boiler due to the recirculation of the heated heavy gas oil fraction therethrough. The emergency steam is withdrawn from the reflux boiler through the transfer line 84 which connects to the transfer lines 86, 88, and 30 having the valves 90, 92, and 94 respectively therein. By passing the emergency steam through these transfer lines while the unit is shut down, the catalyst beds are maintained in a fluidized state until such time as the air blower again begins to function.

In one specific embodiment of the invention, a refinery normally operates by passing 11,610 barrels per stream day, or 153,280 pounds per hour of fresh feed having an A.P.I. gravity of 24.7° through a preheater furnace where it is heated to a temperature of 600° F. and injected into the fluidized bed of a reactor. The cracked products withdrawn from the reactor total 243,545 pounds per hour (2,908.4 moles) including 222,455 pounds per hour of hydrocarbons (1,912.4 moles), 5,170 pounds per hour of inert materials (175.0 moles), 4,378 pounds per hour of steam (821.0 moles) and 1,542 pounds per hour of catalyst. This mixture is transferred to the primary fractionator at a temperature of 900° F. and a heavy gas oil fraction in the amount of 306,270 pounds per hour and having an A.P.I. gravity of 21.0° is withdrawn as a side stream from the primary fractionator at a temperature of 550° F. A portion of this heavy gas oil fraction, 98,500 pounds per hour at a temperature of 550° F., is passed through the intermediate reflux boiler in which 8,145 pounds per hour of steam are made having a quality of 98 percent at 185 pounds per square inch gauge pressure. The cooled heavy gas oil fraction is then recycled to the primary fractionator and is introduced thereto at a temperature of 420° F.

The emergency steam requirements for this plant for the catalyst lift line are 30,000 pounds per hour of steam at 185 pounds per square inch gauge pressure. For the feed injector nozzles, the emergency steam requirement is 15,000 pounds per hour of steam at a pressure of 185 pounds per square inch gauge while for the regenerator distributor ring the emergency steam requirement is 30,000 pounds per hour at a pressure of 185 pounds per square inch gauge.

Should a power failure occur, with resulting loss of compressed air, 158,000 pounds per hour of heavy gas oil can be diverted from the fractionator side stream to the suction side of the feed pump, passed through the preheater furnace and heated to a temperature of 600° F. The heated gas oil fraction is then transferred to the inlet of the intermediate reflux boiler where it is cooled to a temperature of 450° F., thereby providing 15,000,000 B.t.u. per hour of duty in the furnace and reflux boiler, which is sufficient to provide 15,000 pounds per hour of emergency steam, this being 20 percent of the emergency steam required. The capacity of the plant is sufficient to provide the remainder of the emergency steam requirements for the converter.

It will be obvious to those skilled in the art that many modifications may be made within the scope of the present invention without departing from the spirit thereof, and the invention includes all such modifications.

I claim:

1. In a hydrocarbon conversion process employing a feed preheat furnace, a hydrocarbon conversion zone and a regeneration zone containing a fluidized bed of contact material in each of said zones and a primary fractionator wherein products of said hydrocarbon conversion reaction are separated into desired constituents, the method of operation to provide emergency process steam for fluidizing said catalyst beds during an electrical power failure which comprises withdrawing a recycle fraction from said fractionator, passing said withdrawn recycle fraction to said feed preheat furnace, heating said recycle fraction in said preheat furnace, passing said heated recycle fraction to an indirect heat exchanger to generate steam in said heat exchanger, recovering steam from said heat exchanger and passing said recovered steam to said catalyst beds to maintain said beds in a fluidized condition.

2. A method for the production of emergency steam during electrical power failure in a hydrocarbon conversion process employing a fresh feed pump, a fresh feed preheat furnace, a converter having at least one fluidized catalyst bed and a fractionator having at least one normally recycled fraction passing through a reflux boiler which comprises passing said normally recycled fraction separated from said fractionator directly to said fresh feed pump, passing the recycle fraction from said pump to said feed preheat furnace to elevate the temperature of said recycle fraction, passing said recycle fraction at an elevated temperature to said reflux boiler to generate steam therein, recovering steam generated in said reflux boiler and employing the same to fluidize said catalyst in said converter during said electrical power failure and passing said recycled fraction of reduced temperature from said reflux boiler to said fractionator.

3. In a hydrocarbon conversion system employing a product fractionator in conjunction with a fluidized bed of catalyst in a reaction zone and a regeneration zone wherein air from an electrically driven pump is employed to transfer catalyst from the reaction zone to the regeneration zone and to maintain the catalyst in the regeneration zone in a fluidized condition, the method of operation to maintain said catalyst beds in fluidized condition during an electrical power failure which comprises withdrawing a hydrocarbon fraction from said fractionator, passing said hydrocarbon fraction to a feed preheat furnace to elevate the temperature of said hydrocarbon fraction, passing said hydrocarbon fraction at an elevated temperature from said feed preheat furnace to a reflux boiler to generate steam therein, recovering said hydrocarbon fraction from said reflux boiler at a reduced temperature and passing the same to said fractionator, recovering steam from said reflux boiler and passing said recovered steam to said catalyst beds to maintain said beds fluidized during said electrical power failure.

4. A method for the production of steam in a hydrocarbon conversion process employing a fresh feed pump, a feed preheat furnace, a conversion zone and a regeneration zone containing a fluidized bed of catalyst therein and a primary fractionator having at least one normally recycled fraction passing through a reflux boiler which comprises diverting said recycle fraction recovered from said fractionator directly to said feed pump, passing said recycle fraction from said pump to said feed preheat furnace to elevate the temperature of said recycle fraction, recovering said recycle fraction at an elevated temperature from said preheat furnace and passing the same directly to said reflux boiler to generate steam therein thereby cooling said recycle fraction, recovering cooled recycle fraction from said reflux boiler and passing the same to said fractionator and recovering steam from said reflux boiler for use as fluidizing gas in said regeneration zone.

5. In a hydrocarbon conversion process employing a product fractionator, a reflux drum and a fresh feed preheater, the method of generating emergency steam which comprises withdrawing a hydrocarbon fraction from said product fractionator and passing the same to a feed preheat furnace to heat said hydrocarbon fraction to an elevated temperature, withdrawing said hydrocarbon fraction from said furnace at an elevated temperature and passing the same to a reflux drum to generate steam therein, recovering said hydrocarbon fraction from said reflux drum at a reduced temperature for passage directly to said product fractionator and recovering steam from said reflux drum for emergency use in the process.

6. In a hydrocarbon conversion process employing fluidized catalyst, the method of emergency operation which comprises withdrawing a hydrocarbon fraction from a fractionator, passing said withdrawn hydrocarbon fraction to a feed preheat furnace to heat said fraction to an elevated temperature, passing said hydrocarbon fraction at said elevated temperature from said preheat furinace to an indirect heat exchanger associated with said fractionator to generate steam therein, recovering generated steam from said heat exchanger, employing said generated steam to maintain catalyst employed in said process during said emergency in a fluid condition, and recovering said hydrocarbon fraction from said heat exchanger for return to said fractionator.

References Cited in the file of this patent

UNITED STATES PATENTS

| | | |
|---|---|---|
| 2,197,008 | Pew | Apr. 16, 1940 |
| 2,391,366 | Tyson | Dec. 18, 1945 |
| 2,423,637 | Chandler | July 8, 1947 |
| 2,456,310 | Orr | Dec. 14, 1948 |

OTHER REFERENCES

Nelson: Petroleum Refinery Engineering, McGraw-Hill Book Company, Inc., 1949, pages 692–693.